(12) United States Patent
Janakat

(10) Patent No.: US 8,273,401 B2
(45) Date of Patent: Sep. 25, 2012

(54) PHYTOSTEROL/SALT COMPOSITION FOR TOPICAL APPLICATION TO FOOD PRODUCTS

(75) Inventor: Malina Elizabeth Janakat, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 804 days.

(21) Appl. No.: 12/262,838

(22) Filed: Oct. 31, 2008

(65) Prior Publication Data

US 2010/0112185 A1    May 6, 2010

(51) Int. Cl.
A23L 1/237    (2006.01)

(52) U.S. Cl. .................. 426/648; 426/649; 426/289

(58) Field of Classification Search .............. 426/648, 426/649, 289
See application file for complete search history.

(56) References Cited

U.S. PATENT DOCUMENTS

| | | | |
|---|---|---|---|
| 3,881,005 A * | 4/1975 | Thakkar et al. | 514/182 |
| 4,160,850 A * | 7/1979 | Hallstrom et al. | 426/601 |
| 5,156,866 A * | 10/1992 | Sato et al. | 426/5 |
| 6,087,353 A * | 7/2000 | Stewart et al. | 514/182 |
| 6,090,419 A * | 7/2000 | Popplewell et al. | 426/96 |
| 6,136,349 A * | 10/2000 | Karppanen et al. | 426/2 |
| 6,326,050 B1 | 12/2001 | Goto et al. | |
| 6,352,737 B1 * | 3/2002 | Dolhaine et al. | 426/611 |
| 6,441,206 B1 | 8/2002 | Mikkonen et al. | |
| 6,638,547 B2 | 10/2003 | Perlman et al. | |
| 7,144,595 B2 | 12/2006 | Perlman et al. | |
| 2002/0183530 A1 * | 12/2002 | Aaltonen et al. | 552/545 |
| 2003/0165572 A1 * | 9/2003 | Auriou | 424/493 |
| 2005/0042355 A1 | 2/2005 | Perlman et al. | |
| 2005/0064078 A1 | 3/2005 | Nasser et al. | |
| 2006/0035871 A1 * | 2/2006 | Auweter et al. | 514/169 |
| 2006/0115574 A1 | 6/2006 | De Groot et al. | |
| 2007/0031571 A1 | 2/2007 | Blagdon | |
| 2007/0071863 A1 | 3/2007 | Mattson et al. | |

FOREIGN PATENT DOCUMENTS

| WO | WO98/28990 | * | 7/1998 |
|---|---|---|---|
| WO | WO0172136 A1 | | 4/2001 |

OTHER PUBLICATIONS

Johansson, A. 1979. JAOCS 56:886.*
Rotex Inc. 1994. Application-Salt. Rotex Inc., Cincinnati, Ohio. pp. 1-2.*
Hayes et al., Nonesterified Phytosterols Dissolved and Recrystallized in Oil Reduce Plasma Cholesterol in Gerbils and Humans, J. Nutr. 134:1395-1399 (2004).
Benecol® Spreads, http://www.benecol.com/products/index.jhtml?id=benecol/products/pr_spreads.inc, (2009).
http://www.foodnavigator.com/Financial-Industry/Unilever-and-Raisio-sign-patent-peace-deal, Dec. 27, 2007.

* cited by examiner

*Primary Examiner* — Carolyn Paden
(74) *Attorney, Agent, or Firm* — James R. Gourley; Celina M. Orr; Carstens & Cahoon, LLP

(57) ABSTRACT

A phytosterol/salt mixture for even topical application to snack products. At least one free phytosterol in dry form is combined with at least one salt of a similar particle size to form a homogenous blend and applied to the surface of a hot snack food product. The at least one free phytosterol can also be part of a phytosterol blend comprised of at least 95% free phytosterols. To ensure that neither the phytosterol nor salt component settles out and to provide for uniformity of the homogenous blend, the phytosterol blend is of a similar size distribution to the at least one salt. In test runs, a phytosterol blend and at least one salt were combined in a ratio of approximately 53:47, with size ranges determined by sieve analysis to generally fell within the range of 149 to 400 microns.

30 Claims, 1 Drawing Sheet

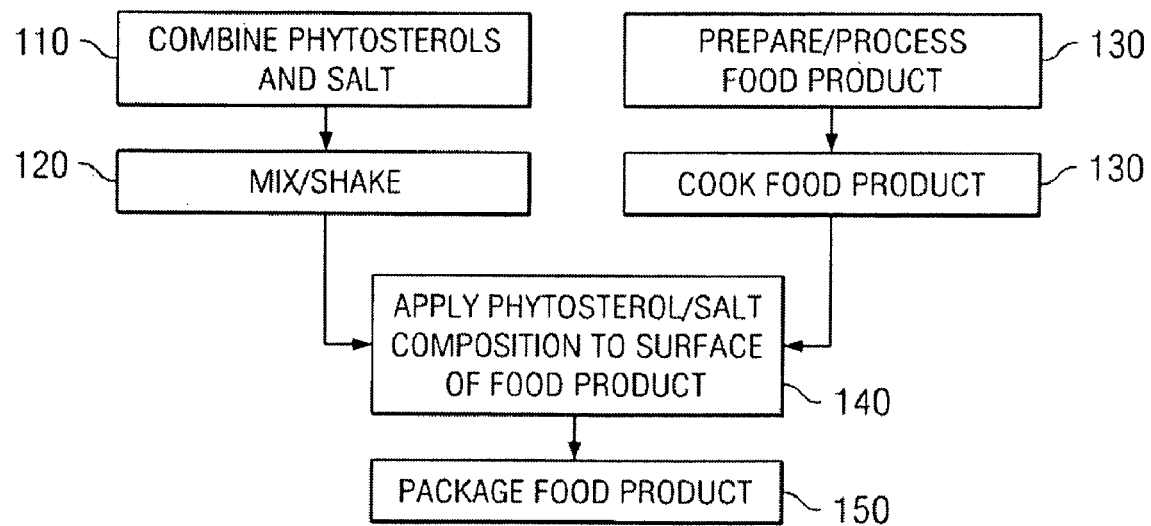

PHYTOSTEROL/SALT COMPOSITION FOR TOPICAL APPLICATION TO FOOD PRODUCTS

BACKGROUND OF THE INVENTION

1. Technical Field

The present invention relates to the incorporation of phytosterols into food products. More specifically, the invention provides a phytosterol/salt mixture suitable for topical application to food products as an alternative to the incorporation of phytosterols by means of its combination with frying oil.

2. Description of Related Art

Cholesterol plays a number of important roles in the human body. To carry out its vital functions, it is transported to and from the cells to perform bodily functions by carriers known as lipoproteins. Low-density lipoprotein (LDL) cholesterol is the major cholesterol carrier in the blood. When too much LDL cholesterol circulates in the blood, it can build up over time and clog the walls of the arteries to the brain or heart, creating health risks such as strokes, atherosclerosis, or coronary heart disease, which can lead to a heart attack.

Studies have shown that consumption of sufficient amounts of phytosterols into the diet can reduce (total and LDL) cholesterol levels by an amount that may decrease the risk of heart attack or stroke by as much as 15%. Phytosterols are a group of plant-derived chemical compounds with the same basic structure as cholesterol. Chemically, phytosterols are $C_{26}$-$C_{30}$ steroid alcohols which an aliphatic side chain at the $C_{17}$ position. The main difference between a cholesterol molecule and a phytosterol molecule is seen in the carbon skeleton of their side chains. Without being bounded by theory, it is believed that because the structure of phytosterol is similar to that of cholesterol, it competes with cholesterol for acceptor sites in the intestine; thus decreasing the amount of cholesterol absorbed in the body. Some also believe that phytosterols may interfere with cholesterol synthesis. Further, phytosterols have been linked with the prevention of inflammation caused by rheumatoid arthritis, the control of blood sugar in diabetics, the reduction of the risk of various types of cancers, and the prevention of inflammation caused by atherosclerosis.

Unlike cholesterol, which can be obtained by processes in the human body, phytosterols can only be obtained through dietary sources. All phytosterols (including phytostanols) are naturally present in small quantities in fruits, vegetables, nuts, seeds, cereals, legumes, vegetable oils and other plant sources; though phytostanols are less abundant in nature. These small traces are not sufficient to provide the consistent dietary intake sufficient to reduce LDL cholesterol levels. While phytosterols are available in tablet form as a nutritional supplement, it has become increasingly desirable to create food products concentrated with enough phytosterol to help provide consumers with the FDA recommended amount of 800 mg/day on a consistent basis for increased health benefits. In addition, phytosterols may be added into food products without harming the taste or texture.

Both free phytosterols as well as phytosterol esters (also known as sterol esters) have been found to be beneficial in human nutrition, along with the compounds derived from them. Reduction of phytosterols, for example, yields saturated phytosterols, known as phytostanols which also have cholesterol-lowering properties. Due to its structure, it is often difficult to produce edible products containing phytosterols in their free (non-esterified) form. Generally, free phytosterols are more difficult to work with because of their insolubility and crystalline nature. Free phytosterols have poor solubility in fats and oils and are insoluble in water; whereas phytosterols esterified with fatty acids known as phytosterol esters are more fat and oil soluble. Phytosterol esters have more thick and waxy-like properties, melting at a lower temperature than free phytosterols, which melt at a temperature of about 300° F. Consequently, interesterification procedures are frequently used to increase the solubility of phytosterols and make them more useful in foods products.

U.S. Pat. No. 6,326,050, for example, discloses an oil or fat composition in which a phytosterol is dissolved in an oil or fat containing fatty acid esters to create an esterified compound. U.S. Pat. No. 6,441,206 to Raisio Benecol Ltd. describes a stanol-based ester added to margarine spreads by dissolving them in cooking oil Benecol® margarine spreads were first introduced into the food market in 1999, followed by Benecol® Smart Chews (caramels), which are also stanol-based. Plant sterols have also been interesterified with fatty acid esters to produce the margarine under the trade name Take Control®, marketed by Unilever. Unilever also produces Flora pro-activ® brand spreads, milk, yogurts and dressings, which are based on plant sterols. These products employ esterified phytosterol in part because free phytosterols are more difficult to work with and tend to settle out of liquid product while the phytosterol esters are soluble in oil-based liquids and therefore stay in solution.

U.S. Pat. Nos. 7,144,595 and 6,638,547, as well as U.S. Pat. App. No. 2005/0042355 by Perlmann et al. (to Brandeis) disclose a method of adding phytosterols to an oil or fat-based composition, wherein the sterols are heated and cooled so that they recrystallized in a form compatible with fried foods. See also Hayes et al., *Nonesterified Phytosterols Dissolved and Rectystallized in Oil Reduce Plasma Cholesterol in Gerbils and Humans*, J. Nutr. 134:1395-1399 (2004). U.S. Pat. App. No. 2007/0071863 to Corazona Foods, Inc. adds oats to tortilla chips fried in phytosterol-containing oils to increase phytosterol levels and reduce cholesterol levels.

U.S. Pat. App. Pub. No. 2005/0064078 by Nasser et al. discloses a method for incorporating phytosterols by adding a phytosterol to at least one flavoring. The method for fried products also incorporates phytosterol into the batter before a frying step. When incorporated into baked goods, the method calls for baking the mixture into the good, rather than a topical application similar to seasonings or salt. Further, the application expressly excludes seasonings such as salts and salt replacements.

Consequently, there is a need for more variety of the methods that introduce phytosterols into food products other than their incorporation into the oils in which foods are fried. There is also a need to create more foods containing phytosterols such that consumers have a more diverse array of products to choose from when attempting to meet the required daily consumption proven to provide positive health effects. Further, there is a need for more cost-effective methods of producing phytosterol-fortified food products. In addition, there is a need for a method which makes free phytosterols easier to handle in terms of food applications. Finally, there is a need for a method that provides for a phytosterol mixture useful in the food industry; and in particular for use with salted snack foods:

SUMMARY OF THE INVENTION

The present invention provides for topical application of free phytosterols, in the form of a dry composition, onto snack food products such as chips made of fruits and/or vegetables, including but not limited to, for example, reduced-fat flat, wavy or ridged fried potato chips, wheat-based snack products, rice-based snack products, corn-based snack products, multi-grain snack products, fruit chips, vegetable chips, reduced fat corn-based chips, baked potato chips, baked corn-based chips, pretzels, crackers, and baked or fried extruded products. The food product of the current invention enriched with phytosterols comprises a layer of a dry homogenous blend of at least one phytosterol and at least one salt, wherein the at least one phytosterol and at least one salt have similar particle size distributions.

The application of free phytosterols as a topical seasoning after the product has already been seasoned with salt has proven difficult. By combining free phytosterols with salt, a separate application step is avoided and application retention is increased significantly. Furthermore, combination mitigates any taste or texture effects that may result from another layer of topical seasoning. A homogeneous mixture of salt and free phytosterols can be achieved by creating a composition having a particle size that is similar to that of the salt typically distributed onto snack products. In one embodiment, the blend of free phytosterols is topically applied in solid form to the surface of a hot food product. Without being bounded by theory, it is believed the hot surface provides for increased adhesion of the particles to the surface. Generally, the surface of the product ranges from between approximately 80° F. and 300° F., and more preferably between approximately 100° F. and 180° F., for sufficient adhesion of the composition to the food product. The method comprises selecting a phytosterol blend in a dry form, having at least one free phytosterol and selecting at least one salt with particle size distribution similar to that of the phytosterol blend selected. These are combined to form a homogenous dry composition and topically applied to the surface of a hot snack food product to produce a phytosterol-enriched food product. The products produced contain about 400 mg of phytosterols per 1 oz. serving.

Further objects and advantages of the present invention will be clear from the description that follows.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flow chart of the overall process for preparing one preferred embodiment of the present invention.

DETAILED DESCRIPTION

Coronary heart disease (CHD) refers to diseases of the heart muscle and supporting blood vessels. High blood total and LDL cholesterol are modifiable risk factors in the development of CHD. Scientific evidence demonstrates that diets including plant components such as phytosterols may reduce the risk of CHD. Consequently, the present invention relates to a composition of phytosterol(s) mixed with salt, capable of producing phytosterol-enriched low fat, reduced fat or fat-free food shack products, including but not limited to sailed or seasoned snack products such as reduced-fat flat, wavy or ridged fried potato chips, wheat-based snack products, rice-based snack products, corn-based snack products, multi-grain snack products, fruit chips, vegetable chips, crackers, pretzels, fried corn-based chips, baked or fried potato chips, baked or fried extruded products and baked corn-based chips, including reduced-fat snack products.

As used herein, the term "food" is used generically to include any solid form of nutrition ingested to produce energy or maintain life. For example, baked, puffed or fried goods made from fruits, vegetables, or dough would all be useful vehicles for the novel composition of the present invention.

The term "phytosterols" is meant to include all plant sterols (i.e., sterol alcohols) and/or plant stands (the ring-saturated derivatives of sterols) and any of their blends or derivatives, which have a structure resembling that of cholesterol, including esterified phytosterols known as phytosterol esters. Thus, any single sterol, blend of sterols, single stanol, blend of stands or any combination thereof may be suitable. Commercially available phytosterols are often mixtures of phytosterols and are also appropriate for use in accordance with the present invention. Thus, the term also includes any synthetically-produced sterol alcohols, their blends having properties that imitate those of naturally occurring plant sterols. Generally, the sterol alcohols may be characterized by a common polycyclic steroid nucleus comprising a 17-carbon ring system, a side chain and a hydroxyl group. The nucleus may either be saturated, wherein the sterol alcohol and/or ester is referred to as a stanol, or be unsaturated, wherein the sterol alcohol is referred to as a sterol. Methods of preparing phytostanols from phytosterols are well known in the art. The most abundant forms of phytosterols in nature are campesterol, beta-sitosterol and stigmasterol; however, the term also includes other modifications to the small side chain of phytosterols such as D7-campesterol, brassicasterol, campestanol, stigmastadienol, clerosterol, sitosterol, sitostanol, avenasterol, alpha-sitosterol. ergosterol, taraxasterol, clionastanol, 22,23-dihydrobrassicasterol, alpha-sitostanol, beta-sitostanol, stigmastanol, 24 beta-methyl cholestanol, A5-Avenosterol, D5-Avenosterol, D7-Avenosterol and D7-Stigmastanol. In one embodiment, the phytosterol is selected from the group consisting of campesterol, beta-sitosterol, stigmasterol, brassicasterol, campestanol, stigmastadienol, clerosterol, sitosterol, sitostanol, and avenasterol, or any combination thereof. As will be appreciated, other types of phytosterols, including any phytosterol esters that are converted to or mixed in with free sterols, are also well within the scope of the present invention.

"Phytosterol esters" refers to phytosterols that have been joined through an ester linkage to fatty acids using a chemical, enzymatic, combination, or other process. Therefore, non-esterified (free) phytosterols refers to phytosterols that have not been esterified to fatty acids.

One embodiment of the present invention will now be described with reference to FIG. 1. To overcome the difficulties of working with phytosterols, and in particular phytosterols in free form, the present invention combines a phytosterol blend having at least one free phytosterol with at least one salt 110 having a similar particle size distribution to the phytosterol blend, which reduces the risk of uneven distribution of the salt and sterols and enables even application of the mixture to the surface of the chip. The phytosterol blend and at least one salt, having similar particle size distributions, are blended together to form a dry homogenous composition. The dry homogenous composition is suitable for even application as a topical layer onto the surface of a food product.

As used herein, the term "phytosterol blend" is used to refer to a blend or mix having at least one free phytosterol, as defined above, which make up a phytosterol component used to create the novel composition of the present invention which substantially comprises non-esterified or free form(s) of phytosterols, as opposed to the esterified forms. Preferably, to "substantially" comprise the free form(s), at least 85% of the phytosterol blend is made of free phytosterols, more preferably 90% of the blend is made up of free phytosterols and most preferably 95% of the blend is made of free phytosterols.

The term "at least one salt" (or "salt blend") is used to refer to one or more salts typically used for the seasoning of food products such as snack chips and typically in micronized form. Salts suitable for use include, without limitation, sodium chloride, calcium chloride, potassium chloride or any variety of mineral salts, sea salts or mined salts, either naturally or synthetically and with or without flow agents.

When Applicant uses the term "similar particle size distribution," it refers to the relative amounts of particle sizes present, when separated on sieves of different sizes using sieve analysis. The particles of the phytosterol(s) blend are comparable to the size and size distributions of the particles of the salt(s) blend such that certain functional results are achieved such as ensuring uniformity of the solid mixture. The phytosterol blend is of a similar size distribution to the salt blend such that neither component settles out. The particle size distributions of the salt and phytosterols used in successful test runs setting forth how comparable these size distributions are, in terms of sieve analysis, are further outlined in Tables 1 and 2, below.

In one embodiment, the present invention utilizes fine flake sodium chloride salt with a particle size distribution as seen in table 1, below. Table 1, for example, shows that the particle size distribution is such that a maximum of about 5% of its particles by weight is retained on a U.S. 40 mesh screen; a maximum of about 45% of its particle by weight is retained on a U.S. 50 mesh screen and a maximum of about 60% of the salt blend particles by weight is retained on a U.S. 70 mesh screen. Fine flake salt suitable for the present invention is commercially available. While one skilled in the art will recognize that sieve analysis does not provide the exact size of a single particle, using the table below, the size ranges for the majority (greater than 70% by mass) of the salt particles generally falls within the range of 149 to 400 microns.

TABLE 1

Particle Size Distribution of Fine Flake Salt.

| Screen Size | Maximum by weight |
|---|---|
| Screen # 20 | 0% |
| Screen # 40 | 5% |
| Screen # 50 | 45% |
| Screen # 70 | 60% |
| Screen # 100 | 47% |
| Pan | 25% |

In one embodiment, the current invention also utilizes a micronized phytosterol powder blend for combination 110 with at least one salt. Commercially available sources of phytosterols are manufactured by Cognis, Forbes Medi-tech, Inc., and Archer Daniels Midland Company (ADM). An even blending of the phytosterol/salt composition is achieved by ensuring that both the phytosterol and salt particles have similar particle sizes or similar particle size distributions. In successful test runs a specialized phytosterol blend in powder form was obtained by grinding the particles down to match the particle size distributions of the salt used. Thus, the phytosterol blend of the present invention has a particle size distribution as seen in Table 2, below, which illustrates that the particle size distribution is such that about 2% of its particles by weight is retained on a U.S. 40 mesh screen; approximately 29% of its particles by weight is retained on a U.S. 50 mesh screen; and approximately 33% of its particles by weight is retained on a U.S. 70 mesh screen. The size range for the majority (about 77.6% by mass) of the phytosterol particles used in the present invention generally falls within the same range as the majority of the particles of the salt blend used (149 to 400 microns).

TABLE 2

Particle Size Distribution of Phytosterol Blend

| Screen Size | Actual Amount by Weight |
|---|---|
| Screen # 20 | 0.0% % |
| Screen # 40 | 2.1% % |
| Screen # 50 | 28.7% % |
| Screen # 70 | 33.8% % |
| Screen # 100 | 15.1% % |
| Pan | 20.3% % |

In alternate embodiments, the particle size range distribution can range further. For example, the phytosterol powder and salt particles sizes can range from a size which allows for retention on a #200 screen to a size which allows for retention on a #20 screen. Further, the particle sizes may be larger than the #200 screen or smaller than the #20 screen so long as the phytosterol blend is of a similar size distribution to the salt blend such that neither component settles out.

Returning to the discussion of FIG. 1, in one test run, the phytosterol and salt were combined 110 in a ratio of approximately 53:47. This ratio was based on the desired salt application per serving as it relates to the necessary amount of phytosterols needed to reach 400 mg, of phytosterols per serving. This ratio can range anywhere from about 99:1 to 1:99, depending on the seasoning needs. One skilled in the art, armed with this disclosure, will recognize that the phytosterol/salt composition can be prepared in either batch or a continuous form. Thus, the mixing 120 is performed by any method of mixing known in the art, including but not limited to gentle blending, conventional blending, tumble blending, ribbon blending, vigorous sheering, vigorous shaking or automated seasoning. The purpose of mixing is to obtain a homogenous blend of the composition not only enable even application onto a food product but also for sufficient hold onto the surface of the food products such that sufficient amounts of phytosterol are retained and subsequently ingested by a consumer to meet specific nutritional goals as well as maintain a simple, one-step topical application process. Having combined phytosterol micronized powder with salt of a similar size, the novel composition of the present invention can then be used as a topical application onto a finished food product.

Separately from the combination 110 and mixing 120 steps, food products to be seasoned are prepared 130. Methods for preparation of snack food products are well known in the art and will therefore not be outlined in great detail herein. Generally, food products are prepared or processed for frying or baking either by slicing, drying, or combining with other ingredients to prepare dough to be cooked by methods such as frying or baking 130. Any number of steps or methods can be employed prior to the cooking step. After the food products are cooked 130, and while still hot, the phytosterol/salt composition 140 is topically applied to the surface of hot food products by any means known in the art including, but not limited to, spraying, tumbling, roller bar application and shaking on, producing chip products with at least 400 mg of phytosterols per serving. Thus, one skilled in the art, armed with this disclosure, will recognize that the topical application of the phytosterol/salt mixture onto the hot food products can be achieved by either batch or continuous form. As used herein; a "hot" surface of a food product suitable for the present invention falls between approximately 80° F. and 300° F., and more preferably between approximately 100° F. and 180° F.

By way of illustration, and without intending to limit the scope of the present invention, the following-example sets forth one method of obtaining the phytosterol-enriched food products. A batch amount was produced by agitative mixing of 81 grams of a phytosterol blend with a specially formulated particle size distribution with 67 grams of sodium chloride salt, each having similar particle size distributions. The mixing was employed for about 10 minutes until a homogenous blend of the composition was achieved. One skilled in the art, armed with this disclosure, will realize that continuous combination can be achieved by metered application into any continuous blending unit operation. Food products having hot surfaces and the prepared phytosterol/salt composition were then added into a seasoning tumbler for a minimum of 5 minutes. Longer times may be necessary if there appears to be a significant amount of powder left at the bottom of the tumbler. A heat gun was used to ensure high temperature of the product in the tumbler such that the novel composition would more readily adhere to the surface of the food product(s), resulting in a food product having 400 mg of phytosterols per 1 ounce-serving. One skilled in the art, armed with this disclosure, will recognize that the application process could be made continuous by applying a pie-blended mix via any typical seasoning application technique—spraying, tumbling, roller bar application and shaking on—while the product surface remains hot. Product could be kept warm by using any technique for insulation of the product to retain residual fryer heat or via any external heating process.

The phytosterol-enriched food products can then be packaged under a packaging step 150 for consumer consumption. Thus, sterols and salts are topically applied in one step to snack food products, including but not limited to potato chips, rather than in two steps consisting of salting followed by seasoning. Further, the topical application allows for the incorporation of heart-healthy additives in one efficient step. Thus, a food product fortified with phytosterols is created without greatly affecting the taste or texture of the food product. While some of the phytosterol in the final product may come from the vegetable oil in which phytosterols are naturally present, this amount is minimal, with a substantial amount coming from the topically applied free phytosterols, rather than any special ingredients used.

Unless otherwise indicated, all numbers expressing quantities of ingredients, reaction conditions, ranges, sizes and so forth used in the specification and claims are to be understood as being modified in all instances by the term "approximately." Accordingly, unless indicated to the contrary, the numerical parameters set forth in the above specification and following claims are approximations that may vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Having thus described the present invention in some details by way of illustration and example, for purposes of clarity of understanding, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only. All patents and publications cited in this disclosure are indicative of the level of skill of those skilled in the art to which this invention pertains.

What is claimed is:

1. A dry phytosterol composition for topical application to food products, consisting of:
   a. a phytosterol powder blend comprising particles of at least 85% non-esterified phytosterol; and
   b. at least one salt, said salt comprising a particle size distribution in which up to 5% by weight of its particles is retained on a U.S. mesh 40 screen, and wherein said particle size distribution is similar to that of said phytosterol powder blend, and further wherein said powder particles and said salt particles provide for application onto the surface of a cooked food product, wherein the phytosterol blend and the at least one salt are combined in a ratio of approximately 53:47.

2. The composition of claim 1, wherein the at least one free phytosterol is selected from the group consisting of: campesterol, beta-sitosterol, stigmasterol, brassicasterol, campestanol, stigmastadienol, clerosterol, sitosterol, sitostanol, and avenasterol and derivatives or combinations thereof.

3. The food product of claim 1, wherein the product is in solid form.

4. The composition of claim 1, wherein the at least one salt is a fine flake salt selected from the group consisting of sodium chloride, calcium chloride, and potassium chloride.

5. The composition of claim 1, wherein up to 60% by weight of the particle size distribution of said salt is retained on a U.S. 70 mesh screen.

6. The composition of claim 1, wherein up to 45% by weight of the particle size distribution of said salt is retained on a U.S. 50 mesh screen.

7. The composition of claim 1, wherein the phytosterol blend has a particle size distribution in which approximately 33% of its particles by weight is retained on a U.S. 70 mesh screen.

8. The composition of claim 1, wherein the phytosterol blend has a particle size distribution in which approximately 29% of its particles by weight is retained on a U.S. 50 mesh screen.

9. The composition of claim 1, wherein the phytosterol blend has a particle size distribution in which approximately 2% of its particles by weight is retained on a U.S. 40 mesh screen.

10. The composition of claim 1 wherein a majority of said particle size distributions falls within a range of approximately 149 to approximately 400 microns.

11. The composition of claim 1 wherein said phytosterol powder blend comprises at least 90% non-esterified phytosterol.

12. A method for producing a phytosterol-enriched food product, comprising:
   a. selecting a phytosterol blend in dry form, wherein said phytosterol blend substantially comprises free phytosterol;
   b. selecting at least one salt with a particle size distribution similar to that of the a phytosterol blend selected in step a);

c. combining the phytosterol blend of step a) and the at least one salt of step b) to form a homogenous dry composition comprising about 53% of said phytosterol blend; and d. topically applying said homogenous dry composition of step c) to the surface of a hot snack food product to produce a phytosterol-enriched food product.

13. The method of claim 12, wherein step a) further comprises selecting the at least one free phytosterol from the group consisting of: campesterol, beta-sitosterol, stigmasterol, brassicasterol, campestanol, stigmastadienol, clerosterol, sitosterol, sitostanol, and avenasterol and derivatives or combinations thereof.

14. The method of claim 12, wherein step b) further comprises selecting a fine flake salt for the at least one salt.

15. The method of claim 12, wherein step b) further comprises selecting the at least one salt from the group consisting of: sodium chloride, calcium chloride, and potassium chloride.

16. The method of claim 12, wherein the at least one salt has a particle size distribution in which up to 60% of its particles by weight is retained on a U.S. 70 mesh screen.

17. The method of claim 12, wherein the at least one salt has a particle size distribution in which up to 45% of its particles by weight is retained on a U.S. 50 mesh screen.

18. The method of claim 12, wherein the at least one salt has a particle size distribution in which up to 5% of its particles by weight is retained on a U.S. 40 mesh screen.

19. The method of claim 12, wherein the phytosterol blend has a particle size distribution in which approximately 33% of its particles by weight is retained on a U.S. 70 mesh screen.

20. The method of claim 12, wherein the phytosterol blend has a particle size distribution in which approximately 29% of its particles by weight is retained on a U.S. 50 mesh screen.

21. The method of claim 12, wherein the phytosterol blend has a particle size distribution in which approximately 2% of its particles by weight is retained on a U.S. 40 mesh screen.

22. The phytosterol-enriched food product produced by the method of claim 12.

23. The food product of claim 12, wherein the food product is in solid form.

24. The method of claim 12, wherein step d) further comprises topically applying said homogenous dry composition of step c) to said hot surface having a temperature of between approximately 100° F. and 180° F.

25. The method of claim 12 wherein said phytosterol blend comprises at least 85% non-esterified phytosterol.

26. The method of claim 12 further comprising the step of grinding said phytosterol blend or said salt to produce said similar particle size distribution.

27. A cooked food product enriched with approximately 400 mg of phytosterols per 1 ounce serving having a layer of a dry homogenous blend adhered onto the surface of said cooked food product, said blend consisting of a mixture of free phytosterol particles and salt particles in a ratio of approximately 53:47, wherein the phytosterol particles and the salt particles have similar particle size distributions, and further wherein a substantial amount of the phytosterols of said food product comes from the topically applied blend.

28. The food product of claim 27, wherein the phytosterol is selected from the group consisting of: campesterol, beta-sitosterol, stigmasterol, brassicasterol, campestanol, stigmastadienol, clerosterol, sitosterol, sitostanol, and avenasterol and derivatives or combinations thereof.

29. The food product of claim 27, wherein the at least one salt is selected from the group consisting of: sodium chloride, calcium chloride, and potassium chloride.

30. A dry phytosterol composition for topical application to food products, consisting of:

a. a phytosterol powder blend comprising particles of at least 85% non-esterified phytosterol; and b. at least one salt, said salt comprising a particle size distribution similar to that of said phytosterol powder blend, and wherein the phytosterol blend and the at least one salt are combined in a ratio of approximately 53:47 and further wherein said powder particles and said salt particles provide for application onto the surface of a cooked food product.

* * * * *